United States Patent
Mi et al.

(10) Patent No.: US 11,677,769 B2
(45) Date of Patent: Jun. 13, 2023

(54) COUNTING SYN PACKETS

(71) Applicant: Hangzhou DPtech Technologies Co., Ltd., Zhejiang Province (CN)

(72) Inventors: Yan Mi, Zhejiang (CN); Zhe Wang, Zhejiang (CN)

(73) Assignee: Hangzhou DPtech Technologies Co., Ltd., Zhejiang Province (CN)

( * ) Notice: Subject to any disclaimer, the term of this patent is extended or adjusted under 35 U.S.C. 154(b) by 421 days.

(21) Appl. No.: 17/005,792

(22) Filed: Aug. 28, 2020

(65) Prior Publication Data

US 2021/0067534 A1    Mar. 4, 2021

(30) Foreign Application Priority Data

Aug. 30, 2019  (CN) .......................... 201910812854.2

(51) Int. Cl.
*H04L 9/40*      (2022.01)
*G06F 11/07*     (2006.01)
*H04L 45/74*     (2022.01)

(52) U.S. Cl.
CPC ........ *H04L 63/1425* (2013.01); *G06F 11/076* (2013.01); *G06F 11/0709* (2013.01); *H04L 45/74* (2013.01)

(58) Field of Classification Search
USPC .......................................................... 726/23
See application file for complete search history.

(56) References Cited

U.S. PATENT DOCUMENTS

| 5,426,538 | A  | * | 6/1995 | Kanota ............... H04N 5/9208 |
| 7,310,759 | B1 | * | 12/2007 | Carmichael ......... G06F 11/1004 |
|           |    |   |        | 716/117 |
| 7,426,634 | B2 |   | 9/2008 | Jain |
| 8,842,687 | B1 | * | 9/2014 | Jackson ............... H04L 49/557 |
|           |    |   |        | 370/419 |

(Continued)

FOREIGN PATENT DOCUMENTS

| CN | 1972286 A   | 5/2007 |
| CN | 101170402 A | 4/2008 |

(Continued)

OTHER PUBLICATIONS

State Intellectual Property Office of the People's Republic of China, Office Action and Search Report Issued in Application No. 201910812854.2, dated May 27, 2021, 12 pages.

*Primary Examiner* — Sakinah White Taylor
(74) *Attorney, Agent, or Firm* — Greenblum & Bernstein, P.L.C.

(57) ABSTRACT

Methods for counting synchronization (SYN) packets to identify a SYN attack, applicable to network device, are provided. The network device includes a field programmable gate array (FPGA) for counting the total number of received SYN packets and a high-speed hardware memory connected to the FPGA. One of the methods includes: periodically traversing the count entries stored in the high-speed hardware memory, and aging any count entry for which a time difference between a current time and a creation time reaches a preset aging time interval; obtaining a first number of SYN packets and a second number of SYN packets; and updating the total number of the received SYN packets with a sum of the first number of SYN packets and the second number of SYN packets.

8 Claims, 2 Drawing Sheets

(56) References Cited

U.S. PATENT DOCUMENTS

| | | | |
|---|---|---|---|
| 9,998,955 B1* | 6/2018 | MacCarthaigh | H04L 69/22 |
| 10,116,693 B1 | 10/2018 | Robinson et al. | |
| 10,284,594 B2 | 5/2019 | Wei et al. | |
| 2005/0125195 A1* | 6/2005 | Brendel | H04L 63/1425 |
| | | | 702/182 |
| 2006/0236208 A1* | 10/2006 | Suzuki | G06F 11/1044 |
| | | | 714/E11.041 |
| 2008/0155670 A1* | 6/2008 | Umesawa | H04L 63/04 |
| | | | 726/6 |
| 2014/0325588 A1* | 10/2014 | Jalan | H04L 63/1466 |
| | | | 726/1 |
| 2017/0262411 A1* | 9/2017 | Nakanishi | G06F 7/535 |
| 2019/0188065 A1* | 6/2019 | Anghel | G06F 11/0778 |
| 2020/0076732 A1* | 3/2020 | Yang | H04L 49/25 |

FOREIGN PATENT DOCUMENTS

| | | | | |
|---|---|---|---|---|
| CN | 101369973 A | | 2/2009 | |
| CN | 102291441 A | | 12/2011 | |
| CN | 105262691 A | | 1/2016 | |
| CN | 105791248 A | | 7/2016 | |
| CN | 105991632 A | | 10/2016 | |
| CN | 107547507 A | | 1/2018 | |
| CN | 107547507 A | * | 1/2018 | |
| CN | 107634971 A | | 1/2018 | |
| CN | 107959690 A | | 4/2018 | |
| CN | 108768942 A | | 11/2018 | |
| CN | 109889550 A | | 6/2019 | |
| CN | 110071939 A | | 7/2019 | |
| EP | 1684463 A1 | * | 7/2006 | H04L 43/026 |
| JP | 2018128991 A | * | 8/2018 | |
| WO | 2009003851 A2 | | 1/2009 | |

\* cited by examiner

COUNTING SYN PACKETS

CROSS REFERENCE TO RELATED APPLICATIONS

The present application claims priority to Chinese Patent Application No. 201910812854.2 entitled "METHODS AND APPARATUSES FOR COUNTING SYN PACKETS TO IDENTIFY A SYN ATTACK" filed on Aug. 30, 2019, the disclosure of which is incorporated herein by reference in its entirety.

TECHNICAL FIELD

The present disclosure relates to computer technologies, particularly to methods and devices for counting synchronization (SYN) packets to identify a SYN attack.

BACKGROUND

In general, the transmission control protocol (TCP) may be used for data communications between a client and a server. When the client and the server use the TCP to establish a connection with each other, three handshakes may be performed: firstly, the client may send a first SYN packet to the server, which corresponds to the first handshake between the client and the server; secondly, the server may return a second SYN packet and a first acknowledgment (ACK) packet to the client in response to the first SYN packet, which corresponds to the second handshake between the client and the server; and then, the server may wait until it receives a second ACK packet from the client, which corresponds to the third handshake between the client and the server. With the three handshakes completed, the client and the server can transmit data to each other.

In some cases, many hackers may forge a large number of fake internet protocol (IP) addresses in a short time, and encapsulate the IP addresses respectively in first SYN packets sent from respective clients to a server. Upon receiving the first SYN packets from the respective clients, the server may return second SYN packets and first ACK packets to the respective clients (the second handshakes), and wait for second ACK packets subsequently from the respective clients. However, since source IP addresses respectively in the first SYN packets do not exist actually, the server may not obtain any response from the clients after sending the second SYN packets and the first ACK packets. Thus, the server may remain in a waiting state, which may affect normal operation of the server and may even cause network congestion and system paralysis. This is the so-called SYN attack.

In order to prevent the SYN attack, a server may be connected to a network device that can identify the SYN attack. If the network device determines that it is under the SYN attack, the network device may stop forwarding SYN packets from clients to the connected server, so as to protect the server from the SYN attack.

In some cases, in order to identify the SYN attack, the network device may determine whether the number of SYN packets passing through the network device within a time interval (for example, a time interval at which an aging mechanism is periodically activated) reaches a preset threshold. If the network device determines that the number of SYN packets passing through the network device within the time interval exceeds the preset threshold, the network device may determine that it is under the SYN attack.

Thus, a method of counting SYN packets may be desired for the above network device, so that the network device can determine whether the server is under the SYN attack.

SUMMARY

The present disclosure may provide a method of counting SYN packets to identify a SYN attack, which is applicable to network device, wherein, the network device includes a field programmable gate array (FPGA) for counting a total number of received SYN packets and a high-speed hardware memory connected to the FPGA; the high-speed hardware memory is stored with a plurality of count entries corresponding to respective source internet protocol (IP) addresses in the received SYN packets, each of the count entries comprising a creation time when the count entry is created, a source IP address corresponding to the count entry, and a cumulative number of a part of the received SYN packets corresponding to the source IP address. One of the methods includes:

periodically traversing the count entries stored in the high-speed hardware memory, and aging any one of the traversed count entries for which a time difference between a current time and the creation time reaches a preset aging time interval; obtaining a first number of SYN packets by cumulating the cumulative number in each of one or more of the count entries which is traversed in a current traversal period and for which the time difference between the current time and the creation time does not reach the preset aging time interval, and obtaining a second number of SYN packets by cumulating a value added to the cumulative number in each of the count entries during and after traversing the count entries in the current traversal period; and updating the total number of the received SYN packets counted by the FPGA with a sum of the first number of SYN packets and the second number of SYN packets.

The present disclosure also provides network devices for counting SYN packets to identify a SYN attack, including: an FPGA for counting a total number of received SYN packets and a high-speed hardware memory connected to the FPGA; wherein the high-speed hardware memory is stored with a plurality of count entries corresponding to respective source IP addresses in the received SYN packets, each of the count entries including a creation time when the count entry is created, a source IP address corresponding to the count entry, and a cumulative number of a part of the received SYN packets corresponding to the source IP address. The FPGA is configured to perform operations including: periodically traversing the count entries stored in the high-speed hardware memory, and aging any one of the traversed count entries for which a time difference between a current time and the creation time reaches a preset aging time interval; obtaining a first number of SYN packets by cumulating the cumulative number in each of one or more of the count entries which is traversed in a current traversal period and for which the time difference between the current time and the creation time does not reach the preset aging time interval, and obtaining a second number of SYN packets by cumulating a value added to the cumulative number in each of the count entries during and after traversing the count entries in the current traversal period; and updating the total number of the received SYN packets counted by the FPGA with a sum of the first number of SYN packets and the second number of SYN packets.

DETAILED DESCRIPTION

Figure 1:
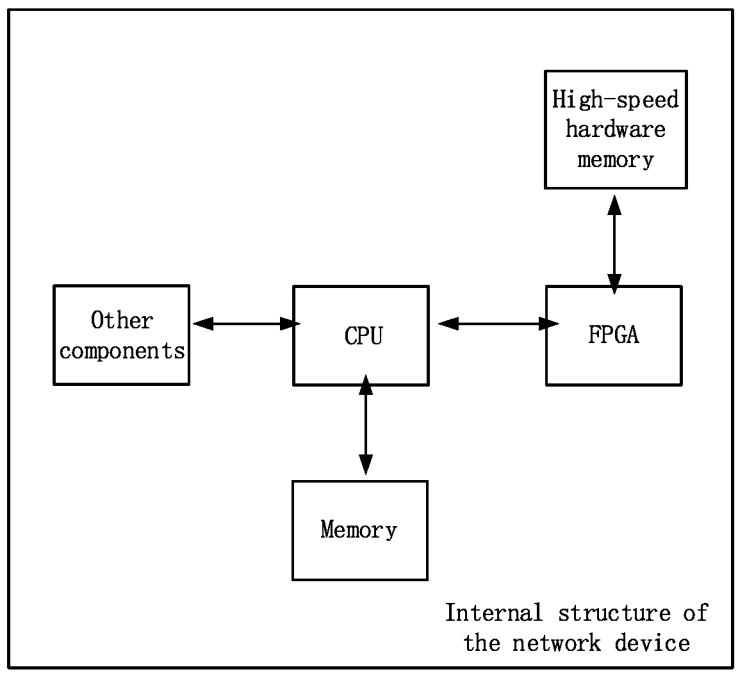
FIG. 1 illustrates a block diagram of a network device according to an example of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein includes any of one or more associated listed items and all possible combinations thereof. It is to be understood that, depending on the context, the word "if" as used herein may be interpreted as "when" or "upon" or "in response to determining".

In some cases, in order to enable a network device to identify SYN attacks, the network device may be set with a counter (hereinafter referred to as the total counter) for counting a total number of received SYN packets. An aging mechanism may be established to periodically clear the counting number in the total counter. In the above cases, if the network device determines that the total number of SYN packets recorded by the total counter exceeds a preset threshold within a time interval (for example, a time period for periodically performing the aging mechanism), the network device may determine that it is under a SYN attack.

In another aspect, in order to obtain source IP addresses of the SYN packets, a network device may be set with a plurality of count entries for counting cumulative numbers of SYN packets corresponding to the source IP addresses of a part of the received SYN packets. Each of the count entry may include a creation time when the count entry is created, a source IP address corresponding to the count entry, and a cumulative number of the received SYN packets corresponding to the source IP address. When the network device determines that it is under a SYN attack, the network device may determine the source IP addresses of the SYN attack packets according to changes of count results in the count entries. For example, the network device may determine a source IP address corresponding to a count entry of which a growth rate of the cumulative number is greater than a preset value as the source IP address of the SYN attack packets.

In some cases, in order to ensure that the count result in the total counter does not continuously accumulate, but keeps increasing and decreasing synchronously with a sum of the count results in count entries to achieve a dynamic balance, and to ensure that the count result does not exceed the preset threshold when the network device is not under the SYN attack, another aging mechanism may be established in the network device. The aging mechanism may be that the network device periodically traverses the count entries, and determines whether a time difference between a current time and a creation time of each count entry reaches an aging time interval (the aging time interval may be preset in the network device). If the time difference between the current time and the creation time of any count entry reaches the aging time interval, the count result in the count entry may be subtracted from the count result in the total counter, and the count result in the count entry may be cleared to ensure that the count result in the total counter does not continuously accumulate, but keeps increasing and decreasing synchronously with a sum of the count results in the count entries to achieve a dynamic balance, such that the count result does not exceed the preset threshold when the network device is not under a SYN attack.

It should be noted that the total counter can be set in a central processing unit (CPU), a field programmable gate array (FPGA) or other locations of the network device; the count entries can be set in the CPU, the FPGA or a high-speed hardware memory of the network device.

Hereinafter, some examples of the present disclosure will be described with reference to the accompanying drawings.

Referring to FIG. 1. FIG. 1 illustrates a block diagram of a network device according to an example of the present disclosure.

As shown in FIG. 1, the network device has a heterogeneous architecture of a CPU and an FPGA, and the FPGA is communicatively connected to a high-speed hardware memory.

The FPGA may process SYN packets received by the network device. When the network device receives the SYN packets, the FPGA may update a total number of SYN packets received by the network device that counted by the FPGA. For example, a total counter can be set in the FPGA for counting the total number of the received SYN packets. The FPGA may also obtain source IP addresses of the received SYN packets, and then communicate with the high-speed hardware memory after obtaining the source IP addresses, so that the high-speed hardware memory can store the SYN packets received by the FPGA.

The high-speed hardware memory may store a plurality of count entries corresponding to respective source IP addresses in the received SYN packets; each count entry includes a creation time when the count entry is created, a source IP address corresponding to the count entry, and a cumulative number of a part of the received SYN packets corresponding to the source IP address;

For example, the high-speed hardware memory may be divided in advance into a plurality of storage address units respectively corresponding to count entries, and the storage address units can store the count entries respectively. In the above cases, when the FPGA receives a SYN packet, the FPGA may obtain the source IP address of the SYN packet, and further determine whether the SYN packet is a SYN packet that entered the network device for the first time according to the source IP address. If the packet is the SYN packet that entered the network device for the first time, the FPGA may send a command to the high-speed hardware memory to create a count entry in a storage address unit that has not stored count entry thereon, and update a count result in the newly created count entry to 1; if the SYN packet is not the SYN packet that entered the network device for the first time, the FPGA can obtain the count result in the count entry corresponding to the source IP address of the SYN packet, and rewrite the count result into the count entry after incrementing the count result.

If the network device has monitored that the total number of SYN packets received by the network device counted by the FPGA in a time interval (for example, a time period for periodically performing the aging mechanism) exceeds the preset threshold, the network device may determine that it is under a SYN attack. For example, the CPU or FPGA of the network device can monitor whether the count result in the total counter in the FPGA exceeds the preset threshold within a time interval, and determine that the network device is under a SYN attack upon monitoring that the count result in the total counter within the time interval exceeds the preset threshold. The preset threshold may be preset by a personnel, or may be generated by the network device according to operating conditions on site.

The network device may have an aging mechanism. For example, the network device may periodically traverse all the storage address units in the high-speed hardware memory, and determine whether a time difference between a current time and a creation time in each count entry reaches an aging time interval (the aging time interval can be preset in the network device). If the time difference between the current time and the creation time of any count entry reaches the aging time interval, the total counter in the FPGA may subtract the count result in the count entry from the count result in the total counter, and clear the count result in the count entry to ensure that the count result in the total counter does not continuously accumulate, but keeps increasing and decreasing synchronously with a sum of the count result in each count entry to achieve a dynamic balance. As such, the count result may not exceed the preset threshold when the network device is not under a SYN attack.

The network device can monitor whether the total number of SYN packets received by the network device in a time interval (for example, a time period for periodically performing the aging mechanism) exceeds the preset threshold. After monitoring that the total number of SYN packets received by the network device with the time interval exceeds the preset threshold, the network device may determine that it is under a SYN attack, and determine a source IP address corresponding to a count entry of which a growth rate of the cumulative number counted in the high-speed hardware memory as a source IP address of the SYN attack packets. Therefore, the network device can identify the SYN attack and obtain the source IP address of the SYN attack packets.

After the network device obtaining the source IP address of the SYN attack packets, the network device can add the source IP address to a filtering blacklist, so that the network device can filter out the SYN packets containing the source IP address, thereby effectively preventing the server from SYN attacks.

In some cases, when a number of SYN packets transmitted through the network device is too large, the FPGA can still accurately record the number of SYN packets transmitted through the network device. However, when the FPGA writes the received SYN packets into the high-speed hardware memory, processing speed of the high-speed hardware memory may be slow, so that the SYN packets sent by the FPGA and to be written to the high-speed hardware memory cannot be completely stored. As such, the SYN packets are miss counted.

In the above case, difference between a total number of SYN packets received by the network device counted by the FPGA and a sum of count results in count entries stored in the high-speed hardware memory may become larger and larger. The total number of SYN packets received by the network device counted by the FPGA may not keep increasing and decreasing synchronously with a sum of the count results in the count entries. Therefore, the total number of SYN packets received by the network device counted by the FPGA may continuously accumulate. When the network device is working normally, the total number of SYN packets received by the network device counted by the FPGA may exceed the preset threshold due to continuous accumulation, causing the network device to mistakenly determine that it is under a SYN attack.

Based on the above, the examples of the present disclosure provide a method of counting SYN packets to identify a SYN attack, which is applicable to the network device shown in FIG. 1.

By periodically obtaining the number of SYN packets stored in the high-speed hardware memory, and updating the total number of SYN packets counted in the FPGA according to the number of SYN packets obtained, the method can ensure a consistency between the total number of received SYN packets counted in the FPGA and the number of SYN packets stored in the high-speed hardware memory.

Figure 2:
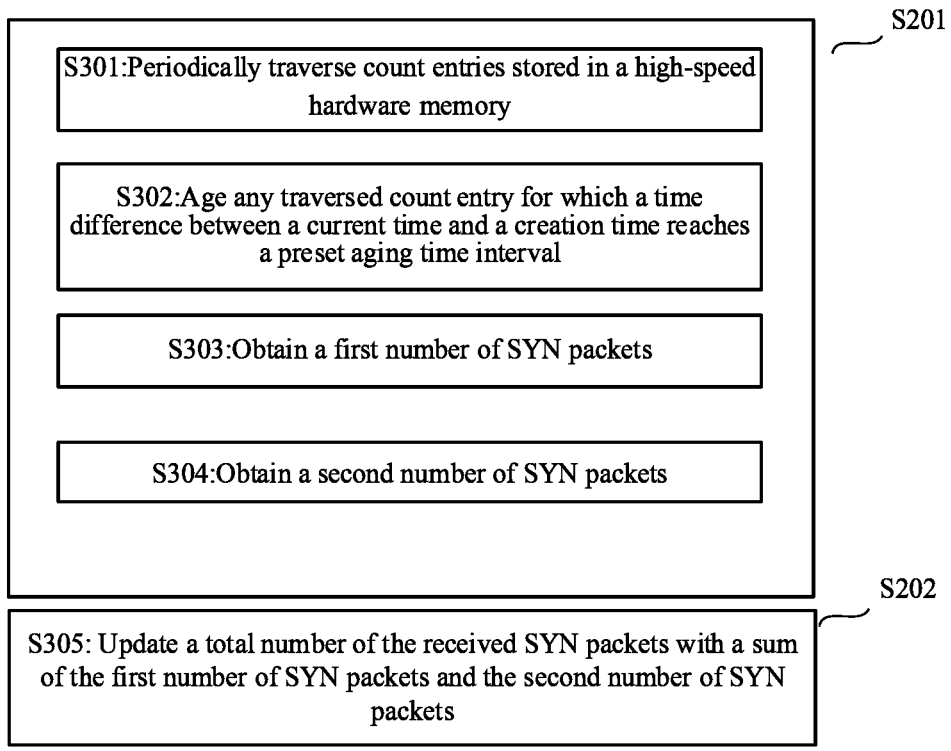
FIG. 2 illustrates a flowchart of a method of counting SYN packets to identify a SYN attack according to an example of the present disclosure.

FIG. 2 illustrates a flowchart of a method of counting SYN packets to identify a SYN attack according to an example of the present disclosure. The method is applicable to a network device. The network device may include an FPGA for counting the received SYN packets and a high-speed hardware memory connected to the FPGA. The high-speed hardware memory is stored with a plurality of count entries corresponding to respective source IP addresses of the received SYN packets; each count entry includes a creation time when the count entry is created, a source IP address and a cumulative number of a part of the received SYN packets corresponding to the source IP address;

As shown in FIG. 2, the method may include steps S201 to S202.

At step S201, the count entries stored in the high-speed hardware memory are traversed periodically, and any one of the traversed count entries for which a time difference between a current time and the creation time reaches a preset aging time interval is aged. A first number of SYN packets is obtained by cumulating a value added to the cumulative number in each of the count entries traversed in a current traversal period for which the time difference between the current time and the creation time does not reach the preset aging time interval. A second number of SYN packets is obtained by cumulating a value added to the cumulative number in each of the count entries during and after traversing the count entries in the current traversal period.

At step S202, the total number of the received SYN packets counted by the FPGA is updated with a sum of the first number of SYN packets and the second number of SYN packets.

It should be noted that steps S201 and S202 can be completed by a CPU, an FPGA or an other controller of the network device alone, or can be completed by the cooperation of various controllers (CPU, FPGA, etc.) in the network device.

According to the examples of the present disclosure, in an aspect, when the network device monitors that the total number of received SYN packets counted by the FPGA within a time interval exceeds a preset threshold, the network device may determine that it is under a SYN attack, and determine a source IP address corresponding to a count entry of which a growth rate of the counted cumulative number as a source IP address of SYN attack packets. In another aspect, the total number of the received SYN packets counted by the FPGA can be increased or decreased synchronously with a sum of the count results in the count entries, and may not continuously accumulate, which prevents the network device from mistakenly determining that it is under a SYN attack due to the total number of received SYN packets keeps accumulating until the preset threshold is exceeded.

As described above, the network device may have an aging mechanism, and the count entries stored in the high-speed hardware memory may be aged. For example, when the CPU or FPGA periodically traverses the count entries stored in the high-speed hardware memory, the CPU or FPGA may determine whether a time difference between a current time and a creation time in each count entry reaches an aging time interval (the aging time interval can be preset in the network device). If the network device determines a time difference between the current time and the creation time of a count entry reaches the aging time interval, the network device may clear a count result in the count entry.

Referring again to FIG. 2, steps S301 to S305 of the above method according to an example of the present disclosure will be described in detail. It should be noted the above steps can be completed by a CPU, an FPGA or an other controller of the network device alone, or can be completed by the cooperation of various controllers (CPU, FPGA, etc.) in the network device. For ease of description, steps S301 to S305 are described below by taking FPGA as the execution entity as an example.

At step S301, count entries stored in a high-speed hardware memory are periodically traversed. At step S302, any traversed count entry for which a time difference between a current time and a creation time reaches a preset aging time interval is aged. At step S303, a first number of SYN packets is obtained by cumulating the cumulative number in each of one or more of the count entries which is traversed in a current traversal period and for which the time difference between the current time and the creation time does not reach the preset aging time interval. At step S304, a second number of SYN packets is obtained by cumulating a value added to the cumulative number in each of the count entries during and after traversing the count entries in the current traversal period. At step S305, a total number of the received SYN packets is updated with a sum of the first number of SYN packets and the second number of SYN packets. In some cases, steps S302-S304 are executed within step S301.

At step S301, the FPGA may preset the time interval for periodically starting the traversal.

For example, the time interval may be preset to 5 s. The FPGA may start the traversal again 5 s after completing the previous traversal of count entries stored in the high-speed hardware memory.

At step S302, when the FPGA periodically traverses each of the count entries stored in the high-speed hardware memory, the FPGA may determine whether a time difference between a current time and a creation time of the count entry reaches the preset aging time interval; if the time difference between the current time and the creation time of the count entry reaches the preset aging time interval, the FPGA may age the count entry.

For example, the preset aging time interval is 2 minutes. A counter for counting the first number of SYN packets may be set in the FPGA. In a traversal period, if a certain count entry with a creation time of 7:58 is traversed by the FPGA, the FPGA may determine that a time difference between a current time 8:00 and the creation time 7:58 of the count entry has reached the preset aging time interval of 2 minutes, and age the count entry and clear a count result in the count entry.

At step S303, when the FPGA periodically traverses each of the count entries stored in the high-speed hardware memory, the FPGA may determine whether the time difference between the current time and the creation time of the count entry reaches the preset aging time interval; if the time difference between the current time and the creation time of the count entry does not reach the preset aging time interval, the FPGA may record the cumulative numbers in the count entries; and accumulate the cumulative numbers in the count entries to obtain the first number of SYN packets.

For example, the preset aging time interval is 2 minutes. A counter for counting the first number of SYN packets may be set in the FPGA. In a traversal period, if a certain count entry with a creation time of 8:59 is traversed by the FPGA, the FPGA may determine that a time difference between a current time 9:00 and the creation time 8:59 of the count entry has not reached the preset aging time interval of 2 minutes, and add a count result in the count entry with a current count result in the counter for counting the first number of SYN packets and record the added count result in to the counter. Upon the traversal period ending, the FPGA may query the count result in the counter for counting the first number of SYN packets, and determine the count result as the first number of SYN packets.

At step S304, the FPGA may determine a sum of values added to the cumulative numbers in the count entries during and after traversing the count entries in the current traversal period as the second SYN packet number.

In an example, the high-speed hardware memory may be divided in advance into a plurality of storage address units respectively corresponding to the plurality of count entries. The FPGA may periodically traverse the count entries in the respective storage address units of the high-speed hardware memory. A first error correction counter is preset in the network device (for example, a first error correction counter is preset in the FPGA).

The FPGA may determine whether a first serial number of a storage address of a target count entry corresponding to a source IP address in each SYN packet to be written into the high-speed hardware memory in the current traversal period is less than or equal to a second serial number of a storage address of a count entry currently being traversed; if the first serial number is less than the second serial number, update a cumulative number in the target count entry, and increment a first count result in the preset first error correction counter. Upon the current traversal period ending, read the first count result in the first error correction counter to obtain the second number of SYN packets. It should be noted that the current traversal period starts when the FPGA sends a first storage address reading command to the high-speed hardware memory and ends when the FPGA receives a last storage address readback result from the high-speed hardware memory.

For example, the storage addresses in the high-speed hardware memory may be numbered from 1 to N. When the FPGA is traversing the count entries with a storage address numbered 10, that is, at any time after the FPGA sending a storage address reading command numbered 10 to the high-speed hardware memory and before the FPGA receiving the storage address readback result numbered 10 from the high-speed hardware memory, if a serial number of the storage address corresponding to a source IP address in a SYN packet to be written into the high-speed hardware memory is less than or equal to 10, the FPGA may determine that the first serial number of the storage address of the target count entry is less than the second serial number of the storage address of the count entry currently being traversed, and update the cumulative number in the target count entry, and increment the first count result in the preset first error correction counter. After the current traversal period, the FPGA may read the first count result in the first error correction counter to obtain the second number of SYN packets.

In another example, the high-speed hardware memory may be divided in advance into a plurality of storage address units respectively corresponding to the plurality of count entries. The FPGA may periodically traverse the count entries in the respective storage address units of the high-speed hardware memory. A second error correction counter may be preset in the network device (for example, a second error correction counter is preset in the FPGA).

The FPGA may determine whether a first serial number of a storage address of a target count entry corresponding to a source IP address in a SYN packet to be written into the high-speed hardware memory in the current traversal period is less than a second serial number of a storage address of a count entry next to a count entry currently being traversed; if the first serial number is less than the second serial number, update a cumulative number in the target count entry, and increment a second count result in the preset second error correction counter. After the current traversal period, the FPGA may read the second count result in the second error correction counter to obtain the second number of SYN packets. It should be noted that the current traversal period starts when the FPGA sends a first storage address reading command to the high-speed hardware memory and ends when the FPGA receives a last storage address readback result from the high-speed hardware memory.

For example, the storage addresses in the high-speed hardware memory may be numbered from 1 to N. When the FPGA is traversing the count entries with a storage address numbered 10, that is, at any time after the FPGA sending a storage address reading command numbered 10 to the high-speed hardware memory and before the FPGA receiving the storage address readback result numbered 10 from the high-speed hardware memory, if a serial number of the storage address corresponding to a source IP address in a SYN packet to be written into the high-speed hardware memory is less than or equal to 10, the FPGA may determine that the first serial number of the storage address of the target count entry is less than the second serial number 10 of the storage address of a count entry next to the count entry currently being traversed, update the cumulative number in the target count entry, and increment the second count result in the preset second error correction counter. After the current traversal period, the FPGA may read the second count result in the second error correction counter to obtain the second number of SYN packets.

In some cases, assuming that the FPGA is traversing the count entries in the last storage address unit (numbered N), the serial number of the storage address of the count entry next to the count entry currently being traversed is 1. Since when the last storage unit is being traversed, the serial number of last storage address of the target count entry corresponding to the source IP address of the SYN packet to be written into the high-speed hardware memory must be greater than or equal to 1, the number of new SYN packets stored in high-speed hardware memory may be missed.

In order to count accurately, in an example, a third error correction counter may be preset in the network device (for example, a third error correction counter is preset in the FPGA).

During a process of traversing the last storage address unit in the current traversal period, incrementing a third count result in the preset third error correction counter whenever a SYN packet is written into the high-speed hardware memory. The process of traversing a last storage address unit starts when the FPGA sends a last storage address reading command to the high-speed hardware memory and ends when the FPGA receives a last storage address readback result from the high-speed hardware memory. After the current traversal period, the FPGA may sum the second count result in the second error correction counter and the third count result in the third error correction counter to obtain the second number of SYN packets.

At step S305, upon a traversal period ending, the FPGA may update the total number of received SYN packets counted by the FPGA with a sum of the number of the obtained first number of SYN packets and the obtained second number of SYN packets.

For example, the FPGA is set with a total counter for counting the total number of the received SYN packets. In this example, a count result in the total counter may be updated as the sum of the first number of SYN packets and the second number of SYN packets. Therefore, the count result in the total counter may not continuously accumulate, so that the following situation can be avoided: when the network device receives a large number of SYN packets, the count result in the total counter may reach a maximum value that the total counter can record, causing the total counter to record from zero and resulting in confusing count results.

Corresponding to the above method examples, the present disclosure also provides an apparatus for counting SYN packets to identify a SYN attack, which is applicable to the network device shown in FIG. 1.

The network device includes an FPGA for counting the total number of received SYN packets and a high-speed hardware memory connected to the FPGA. The high-speed hardware memory is stored with a plurality of count entries corresponding to respective source IP addresses in the received SYN packets; each count entry includes a creation time when the count entry is created, a source IP address and a cumulative number of the received SYN packets corresponding to the source IP address.

Figure 3:
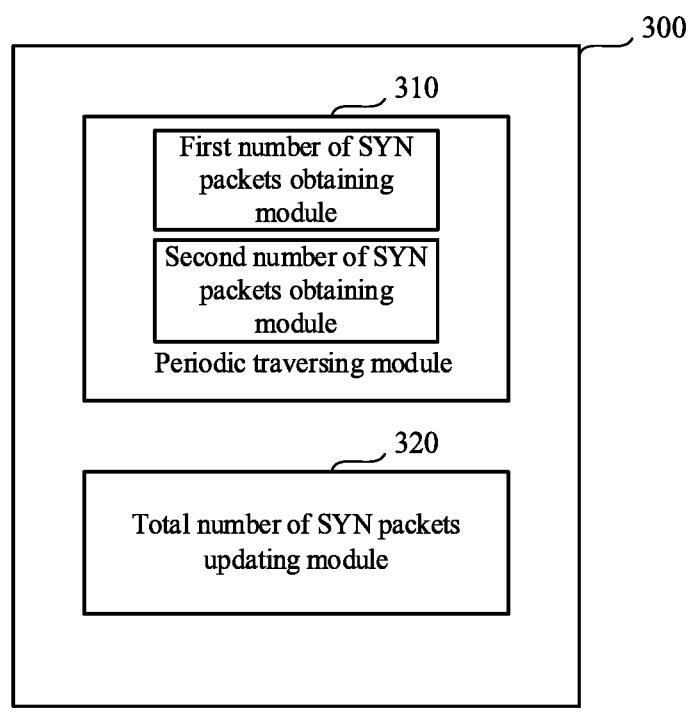
FIG. 3 illustrates a block diagram of an apparatus for counting SYN packets to identify a SYN attack according to an example of the present disclosure.

FIG. 3 illustrates a block diagram of an apparatus 300 for counting SYN packets to identify a SYN attack according to an example of the present disclosure. The apparatus 300 may include a periodic traversing module 310 and a total number of SYN packets updating module 320.

The periodic traversing module 310 may traverse the count entries stored in the high-speed hardware memory periodically, and age any count entry of which a time difference between a current time and the creation time reaches a preset aging time interval; and obtain a first number of SYN packets by cumulating the cumulative number in each of one or more of the count entries which is traversed in a current traversal period and for which the time difference between the current time and the creation time does not reach the preset aging time interval and obtain a second number of SYN packets by cumulating a value added to the cumulative number in each of the count entries during and after traversing the count entries in the current traversal period.

The total number of SYN packets updating module 320 may update the total number of received SYN packets with a sum of the first number of SYN packets and the second number of SYN packets.

In some examples, the periodic traversing module 310 may also include a first number of SYN packets obtaining module. For each count entry being traversed, the first number of SYN packets obtaining module may determine whether a time difference between the current time and the creation time of the count entry reaches a preset aging time interval, and record the cumulative number in the count entry if the time difference between the current time and the creation time of the count entry does not reach the preset aging time interval. The first number of SYN packets obtaining module may obtain the first number of SYN packets by accumulating the recorded cumulative numbers in the count entries.

In some examples, the high-speed hardware memory may be divided in advance into a plurality of storage address units respectively corresponding to the plurality of count entries; a first error correction counter may be preset in the network device; and the periodic traversing module 310 may further include a second number of SYN packets obtaining module.

The second number of SYN packets obtaining module may determine whether a first serial number of a storage address of a target count entry corresponding to the source IP address in each SYN packet to be written into the high-speed hardware memory in the current traversal period is less than or equal to a second serial number of a storage address of a count entry currently being traversed; if the first serial number is less than the second serial number, update the cumulative number in the target count entry, and increment a first count result in the preset first error correction counter; the current traversal period starts when the FPGA sends a first storage address reading command to the high-speed hardware memory and ends when the FPGA receive a last storage address readback result from the high-speed hardware memory; and upon the current traversal period ending, the second number of SYN packets obtaining module may read the first count result in the first error correction counter to obtain the second number of SYN packets.

In some examples, the high-speed hardware memory may be divided in advance into a plurality of storage address units respectively corresponding to the plurality of count entries; a second error correction counter may be preset in the network device; and the periodic traversing module 310 may further include a second number of SYN packets obtaining module.

The second number of SYN packets obtaining module may determine whether a first serial number of a storage address of a target count entry corresponding to a source IP address in a SYN packet to be written into the high-speed hardware memory in the current traversal period is less than a second serial number of a storage address of a count entry next to a count entry currently being traversed; if the first serial number is less than the second serial number, update a cumulative number in the target count entry, and increment a second count result in the preset second error correction counter. The current traversal period starts when the FPGA sends a first storage address reading command to the high-speed hardware memory and ends when the FPGA receives a last storage address readback result from the high-speed hardware memory. After the current traversal period, the second number of SYN packets obtaining module may read the second count result in the second error correction counter to obtain the second number of SYN packets.

In some examples, a third error correction counter may be preset in the network device; the periodic traversing module 310 may further include a SYN packets number obtaining module for the SYN packets missed in the traversal process.

During a process of traversing a last storage address unit in the current traversal period, the SYN packets number obtaining module for the missed SYN packets missed in the traversal process may increment a third count result in the preset third error correction counter whenever a SYN packet is written into the high-speed hardware memory. The process of traversing the last storage address unit starts when the FPGA sends a last storage address reading command to the high-speed hardware memory and ends when the FPGA receives a last storage address readback result from the high-speed hardware memory. Upon the current traversal period ending, the SYN packets number obtaining module for the SYN packets missed in the traversal process may sum the second count result in the second error correction counter and the third count result in the third error correction counter to obtain the second number of SYN packets.

Since the apparatus examples substantially correspond to the method examples, a reference can be made to part of the descriptions of the method examples for the related part. The apparatus examples described above are merely illustrative, where the units described as separate members can be or not be physically separated, and the members displayed as units can be or not be physical units, i.e., can be located in one place, or can be distributed to a plurality of network units. Part or all of the modules can be selected based on actual requirements to implement the objectives of the solutions in the present disclosure. Those of ordinary skill in the art can understand and carry out them without creative work.

Examples of the subject matter and functional operations described in this disclosure can be implemented in one or a combination of: a digital electronic circuit, tangibly embodied computer software or firmware, computer hardware including the structures disclosed in this disclosure and their structural equivalents. Examples of the subject matter described in this disclosure can be implemented as one or more computer programs, that is, one or more modules of computer program instructions encoded on a tangible non-transitory program carrier to be executed by or control a data processing apparatus. Alternatively or additionally, program instructions can be encoded on an artificially generated propagation signal, such as a machine-generated electrical, optical or electromagnetic signal, which is generated to encode and transmit the information to a suitable receiver apparatus and to be executed by the processing apparatus. The computer storage medium can be a machine-readable storage device, a machine-readable storage substrate, a random or serial access memory device, or a combination of one or more of them.

The processes and logic flows described in this disclosure can be performed by one or more programmable computers that execute one or more computer programs to perform corresponding functions by operating according to input data and generating output. The processing and logic flow can also be performed by a dedicated logic circuit, such as an FPGA (field programmable gate array) or an ASIC (application specific integrated circuit), and the apparatus can also be implemented as a dedicated logic circuit.

Computers suitable for executing computer programs include, for example, general-purpose and/or special-purpose microprocessors, or any other type of central processing units. Generally, the central processing unit will receive instructions and data from a read-only memory and/or a random access memory. The basic components of a computer include a central processing unit for implementing or executing instructions and one or more memory devices for storing instructions and data. Generally, the computer will also include one or more mass storage devices for storing data, such as magnetic disks, magneto-optical disks, or optical disks, or the computer will be operably coupled to the mass storage device from/to which data is received or transmitted, or both. However, the computer does not have to have such a device. In addition, the computer can be embedded in another device, such as a mobile phone, a personal digital assistant (PDA), a mobile audio or a video player, a game console, a global positioning system (GPS) receiver, or, for example, a portable storage device of a universal serial bus (USB) flash drive, to name a few.

Computer-readable media suitable for storing computer program instructions and data include all forms of non-volatile memories, media, and memory devices, including, for example, semiconductor memory devices (such as EPROMs, EEPROMs, and flash memory devices), magnetic disks (such as internal hard disks or removable disks), magneto-optical disks and CD-ROMs and DVD-ROM disks. The processor and the memory can be supplemented by, or incorporated in, dedicated logic circuits.

Although this disclosure contains many specific implementation details, these should not be construed as limiting the scope of any disclosure or the scope of protection as claimed, but are mainly used to describe features of some examples of this disclosure. Certain features described in multiple examples within this disclosure can also be implemented in combination in a single example. On the other hand, various features described in a single example can also be implemented separately in multiple examples or in any suitable sub-combination. Furthermore, although features can function in certain combinations as described above and even initially claimed as such, in some cases one or more features from the claimed combination can be removed from the combination and required protected combinations can point to sub-combinations or variations of sub-combinations.

Similarly, although the operations are depicted in a specific order in the drawings, this should not be construed as requiring these operations to be performed in the specific order shown or sequentially, or requiring all illustrated operations to be performed to achieve the desired result. In some cases, multitasking and parallel processing can be advantageous. In addition, the separation of various system modules and components in the above examples should not be understood as requiring such separation in all examples, and it should be understood that the described program components and systems can generally be integrated together in a single software product medium, or packaged into multiple software products.

The above are only some examples of the present disclosure, and are not intended to limit the present disclosure. Any modifications, equivalent replacements, improvements, etc. made within the spirit and principles of the present disclosure should fall in the scope of the present disclosure.

What is claimed is:

1. A method of counting synchronization (SYN) packets to identify a SYN attack, which is applicable to a network device,
wherein the network device comprises a field programmable gate array (FPGA) for counting a total number of received SYN packets and a high-speed hardware memory connected to the FPGA; and
the high-speed hardware memory is stored with a plurality of count entries corresponding to respective source internet protocol (IP) addresses in the received SYN packets, each of the count entries comprising a creation time when the count entry is created, a source IP address corresponding to the count entry, and a cumulative number of a part of the received SYN packets corresponding to the source IP address,
the method comprising:
periodically traversing the count entries stored in the high-speed hardware memory, and aging any one of the traversed count entries for which a time difference between a current time and the creation time reaches a preset aging time interval;
obtaining a first number of SYN packets by cumulating the cumulative number in each of one or more of the count entries which is traversed in a current traversal period and for which the time difference between the current time and the creation time does not reach the preset aging time interval, and obtaining a second number of SYN packets by cumulating a value added to the cumulative number in each of the count entries during and after traversing the count entries in the current traversal period; and
updating the total number of the received SYN packets counted by the FPGA with a sum of the first number of SYN packets and the second number of SYN packets,
wherein (i)
the high-speed hardware memory is divided in advance into a plurality of storage address units respectively corresponding to the plurality of count entries;
a first error correction counter is preset in the network device; and
obtaining the second number of SYN packets comprises:
determining whether a first serial number of a storage address of a target count entry corresponding to the source IP address in each SYN packet to be written into the high-speed hardware memory in the current traversal period is less than or equal to a second serial number of a storage address of a count entry currently being traversed and, in response to the first serial number being less than or equal to the second serial number, updating the cumulative number in the target count entry and incrementing a first count result in the preset first error correction counter, wherein the current traversal period starts when the FPGA sends a first storage address read command to the high-speed hardware memory and ends when the FPGA receives a last storage address readback result from the high-speed hardware memory; and
upon the current traversal period ending, reading the first count result in the first error correction counter as the second number of SYN packets;
or,
wherein (ii)
the high-speed hardware memory is divided in advance into the plurality of storage address units respectively corresponding to the plurality of count entries;
a second error correction counter is preset in the network device; and
obtaining the second number of SYN packets comprises:
determining whether the first serial number of the storage address of the target count entry corresponding to the source IP address of each SYN packet to be written into the high-speed hardware memory in the current traversal period is less than the second serial number of the storage address of a count entry next to the count entry currently being traversed and, in response to the first serial number being less than the second serial number, updating the cumulative number in the target count entry and incrementing a second count result in the preset second error correction counter, wherein the current traversal period starts when the FPGA sends the first storage address read command to the high-speed hardware memory and ends when the FPGA receives the last storage address readback result from the high-speed hardware memory; and upon the current traversal period ending, reading the second count result in the second error correction counter as the second number of SYN packets.

2. The method of claim 1, wherein obtaining the first number of SYN packets comprises:
for each of the traversed count entries, determining whether the time difference between the current time and the creation time in the count entry reaches the preset aging time interval and, in response to the time difference between the current time and the creation time in the count entry not reaching the preset aging time interval, recording the cumulative number in the count entry; and
obtaining the first number of SYN packets by accumulating the recorded cumulative number.

3. The method of claim 1, wherein a third error correction counter is preset in the network device,
the method further comprising:
during a process of traversing a last storage address unit in the current traversal period, incrementing a third count result in the preset third error correction counter whenever a SYN packet is written into the high-speed hardware memory; and
upon the current traversal period ending, obtaining a sum of the second count result in the second error correction counter and the third count result in the third error correction counter as the second number of SYN packets.

4. The method of claim 3, wherein the process of traversing the last storage address unit starts when the FPGA sends a last storage address read command to the high-speed hardware memory and ends when the FPGA receives a last storage address readback result from the high-speed hardware memory.

5. A network device for counting SYN packets to identify a SYN attack, comprising:
an FPGA for counting a total number of received SYN packets; and
a high-speed hardware memory connected to the FPGA, wherein the high-speed hardware memory is stored with a plurality of count entries corresponding to respective source IP addresses in the received SYN packets, each of the count entries comprising a creation time when the count entry is created, a source IP address corresponding to the count entry, and a cumulative number of a part of the received SYN packets corresponding to the source IP address; and
the FPGA is configured to perform operations comprising:
periodically traversing the count entries stored in the high-speed hardware memory, and aging any one of the traversed count entries for which a time difference between a current time and the creation time reaches a preset aging time interval;
obtaining a first number of SYN packets by cumulating the cumulative number in each of one or more of the count entries which is traversed in a current traversal period and for which the time difference between the current time and the creation time does not reach the preset aging time interval, and obtaining a second number of SYN packets by cumulating a value added to the cumulative number in each of the count entries during and after traversing the count entries in the current traversal period; and
updating the total number of the received SYN packets counted by the FPGA with a sum of the first number of SYN packets and the second number of SYN packets,
wherein (i)
the high-speed hardware memory is divided in advance into a plurality of storage address units respectively corresponding to the plurality of count entries;
a first error correction counter is preset in the network device; and
obtaining the second number of SYN packets comprises:
determining whether a first serial number of a storage address of a target count entry corresponding to the source IP address in each SYN packet to be written into the high-speed hardware memory in the current traversal period is less than or equal to a second serial number of a storage address of a count entry currently being traversed and, in response to the first serial number being less than or equal to the second serial number, updating the cumulative number in the target count entry and incrementing a first count result in the preset first error correction counter, wherein the current traversal period starts when the FPGA sends a first storage address read command to the high-speed hardware memory and ends when the FPGA receives a last storage address readback result from the high-speed hardware memory; and
upon the current traversal period ending, reading the first count result in the first error correction counter as the second number of SYN packets;
or,
wherein (ii)
the high-speed hardware memory is divided in advance into the plurality of storage address units respectively corresponding to the plurality of count entries;
a second error correction counter is preset in the network device; and
obtaining the second number of SYN packets comprises:
determining whether the first serial number of the storage address of the target count entry corresponding to the source IP address in each SYN packet to be written into the high-speed hardware memory in the current traversal period is less than the second serial number of the storage address of a count entry next to the count entry currently being traversed and, in response to the first serial number being less than the second serial number, updating the cumulative number in the target count entry and incrementing a second count result in the preset second error correction counter, wherein the current traversal period starts when the FPGA sends the first storage address read command to the high-speed hardware memory and ends when the FPGA receives the last storage address readback result from the high-speed hardware memory; and
upon the current traversal period ending, reading the second count result in the second error correction counter as the second number of SYN packets.

6. The network device of claim 5, wherein obtaining the first number of SYN packets comprises:
for each of the traversed count entries, determining whether the time difference between the current time and the creation time in the count entry reaches the preset aging time interval and, in response to the time difference between the current time and the creation time in the count entry not reaching the preset aging time interval, recording the cumulative number in the count entry; and obtaining the first number of SYN packets by accumulating the recorded cumulative number.

7. The network device of claim 5, wherein a third error correction counter is preset in the network device, the operations further comprising:

during a process of traversing a last storage address unit in the current traversal period, incrementing a third count result in the preset third error correction counter whenever a SYN packet is written into the high-speed hardware memory; and upon the current traversal period ending, obtaining a sum of the second count result in the second error correction counter and the third count result in the third error correction counter as the second number of SYN packets.

8. The network device of claim 7, wherein the process of traversing the last storage address unit starts when the FPGA sends a last storage address read command to the high-speed hardware memory and ends when the FPGA receives a last storage address readback result from the high-speed hardware memory.

* * * * *